(12) United States Patent
Konishi (10) Patent No.: US 7,796,182 B2
(45) Date of Patent: Sep. 14, 2010

(54) IMAGE-TAKING APPARATUS AND FOCUSING METHOD

(75) Inventor: Kazuki Konishi, Shinjuki-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 11/408,555

(22) Filed: Apr. 20, 2006

(65) Prior Publication Data

US 2006/0238641 A1 Oct. 26, 2006

(30) Foreign Application Priority Data

Apr. 21, 2005 (JP) ............................. 2005-124305

(51) Int. Cl.
  H04N 5/232 (2006.01)
  H04N 3/00 (2006.01)
  H04N 5/225 (2006.01)
  H04N 3/14 (2006.01)
  H04N 5/235 (2006.01)
  G03B 17/00 (2006.01)

(52) U.S. Cl. ...................... 348/345; 348/346; 348/349; 396/79

(58) Field of Classification Search ............ 348/208.11, 348/326, 345–349, 220.1, 745, 296, 297, 348/362; 396/79–82
  See application file for complete search history.

(56) References Cited

U.S. PATENT DOCUMENTS 6,094,223 A * 7/2000 Kobayashi .................. 348/354
6,727,949 B1 * 4/2004 Saruwatari et al. .......... 348/349
2004/0263674 A1 * 12/2004 Koreki ....................... 348/345
2006/0239654 A1 * 10/2006 Kawamura ................... 386/107

FOREIGN PATENT DOCUMENTS

| JP | 2000-224458 | 8/2000 |
| JP | 2003-348426 | 12/2003 |
| WO | 2005/002212 | 1/2005 |

* cited by examiner

Primary Examiner—Tuan Ho
Assistant Examiner—Marly Camargo
(74) Attorney, Agent, or Firm—Canon U.S.A., Inc. I.P. Division (57) ABSTRACT

An image-taking apparatus is disclosed which can record a still image in sharp focus during moving-image recording without a large change in the focus state of the recorded moving image. The image-taking apparatus includes a signal generator which generates a focus evaluation signal representing a focus state based on an output signal from an image-pickup device, and a controller which drives the focus lens such that an in-focus position is searched for based on the focus evaluation signal in performing moving-image recording, and drives the focus lens in a predetermined scan area to detect an in-focus position based on the focus evaluation signal and drives the focus lens to the detected in-focus position in performing still-image recording. The focus lens is driven in a first scan area in performing still-image recording in a still-image recording mode and the focus lens is driven in a second scan area smaller than the first scan area in performing still-image recording in a moving-image recording mode.

7 Claims, 8 Drawing Sheets

IMAGE-TAKING APPARATUS AND FOCUSING METHOD

BACKGROUND OF THE INVENTION

The present invention relates to an image-taking apparatus which adjusts focus of an image-taking optical system by using an image signal provided through photoelectrical conversion of an object image formed by the image-taking optical system and which allows recording of a still image during recording of a moving image.

Japanese Patent Laid-Open No. 2000-224458 has proposed a method of performing auto-focus (AF) operation quickly in still-image recording in an image-taking apparatus which allows moving-image recording and still-image recording. In the method, focus adjustment is performed continuously during moving-image recording, and to activate still-image recording during the moving-image recording, the focus adjustment continuously performed until that point is stopped.

Japanese Patent Laid-Open No. 2003-348426 has proposed a method of performing auto-focus operation quickly in still-image recording in an image-taking apparatus for still-image recording. The method involves a determination of the state of continuous AF processing before an instruction to start AF for still-image recording (detection of an S1 signal) during taking of a through image, and setting of a range and a direction of search for an in-focus position after the instruction to start AF for still-image recording depending on the determination result. Specifically, when the state of continuous AF processing immediately before the detection of the S1 signal is in the course of fine adjustment, only a region near the current position of a focus lens is searched for focusing.

When the focus lens is being driven toward a detected in-focus position, only a region near the detected in-focus position is searched for focusing. When the in-focus position is being searched for, the focus lens is driven for searching in the current driving direction from the current position to achieve focusing. In other cases, the entire region is searched for focusing.

In the method proposed in Japanese Patent Laid-Open 2000-224458, however, the continuous focus adjustment operation performed until the start of still-image recording is stopped at that point. If an in-focus state has not been achieved by the time the still-image recording is started, a focused still image cannot be recorded. The still-image recording may require a larger number of image pixels to be recorded than in the moving-image recording, and in this case, if the focus adjustment operation is stopped at the time of start of still-image recording, the still image may not be sufficiently focused even when an adequate in-focus state is achieved for a moving image.

On the other hand, in the method proposed in Japanese Patent Laid-Open No. 2003-348426, the AF processing state before the instruction to start AF for still-image recording is determined to set the AF operation after the instruction. If this is used in an image-taking apparatus which records a still image during moving-image recording, a focus lens is moved largely before the start of still-image recording to cause a great change of the focus state, resulting in the problem of recording of an unnatural moving image.

BRIEF SUMMARY OF THE INVENTION

It is an object of the present invention to provide an image-taking apparatus which can record a still image in sharp focus during moving-image recording without a large change in the focus state of the recorded moving image.

According to one aspect, the present invention provides an image-taking apparatus which has a moving-image recording mode and a still-image recording mode and allows still-image recording in the moving-image recording mode. The image-taking apparatus includes an image-pickup device which photoelectrically converts an object image formed by an image-taking optical system including a focus lens and a signal generator which generates a focus evaluation signal representing a focus state based on an output signal from the image-pickup device. The image-taking apparatus also includes a controller which drives the focus lens such that an in-focus position is searched for based on the focus evaluation signal in performing moving-image recording, drives the focus lens in a predetermined scan area to detect an in-focus position based on the focus evaluation signal and drives the focus lens to the detected in-focus position in performing still-image recording. The controller drives the focus lens in a first scan area in performing still-image recording in the still-image recording mode and drives the focus lens in a second scan area smaller than the first scan area in performing still-image recording in the moving-image recording mode.

According to another aspect, the present invention provides an image-taking apparatus which allows still-image recording during moving-image recording. The image-taking apparatus includes an image-pickup device which photoelectrically converts an object image formed by an image-taking optical system including a focus lens and a signal generator which generates a focus evaluation signal representing a focus state based on an output signal from the image-pickup device. The image-taking apparatus also includes a controller which drives the focus lens such that an in-focus position is searched for based on the focus evaluation signal in performing moving-image recording, drives the focus lens in a predetermined scan area to detect an in-focus position based on the focus evaluation signal and drives the focus lens to the detected in-focus position in performing still-image recording. The controller changes the scan area of the focus lens based on the focus evaluation signal at the time of an instruction to perform focus adjustment operation for still-image recording when the still-image recording is performed during moving-image recording.

According to yet another aspect, the present invention provides an image-taking apparatus which allows still-image recording during moving-image recording. The image-taking apparatus includes an image-pickup device which photoelectrically converts an object image formed by an image-taking optical system including a focus lens and a signal generator which generates a focus evaluation signal representing a focus state based on an output signal from the image-pickup device. The image-taking apparatus also includes a controller which drives the focus lens such that an in-focus position is searched for based on the focus evaluation signal in performing moving-image recording, drives the focus lens in a predetermined scan area to detect an in-focus position based on the focus evaluation signal and drives the focus lens to the detected in-focus position in performing still-image recording. The controller does not drive the focus lens for in-focus position detection when still-image recording is performed during moving-image recording, and an in-focus level based on the focus evaluation signal is low at the time of an instruction to perform focus adjustment operation for the still-image recording.

According to a further aspect, the present invention provides a method of focusing of an image-taking apparatus which has a moving-image recording mode and a still-image recording mode and allows still-image recording in the moving-image recording mode. The focusing method includes a first step of generating a focus evaluation signal representing a focus state based on an output signal from an image-pickup device which photoelectrically converts an object image formed by an image-taking optical system including a focus lens and a second step of driving the focus lens such that an in-focus position is searched for based on the focus evaluation signal in performing moving-image recording. The method also includes a third step of driving the focus lens in a predetermined scan area to detect an in-focus position based on the focus evaluation signal and driving the focus lens to the detected in-focus position in performing still-image recording. The focus lens is driven in a first scan area in performing still-image recording in the still-image recording mode and the focus lens is driven in a second scan area smaller than the first scan area in performing still-image recording in the moving-image recording mode in the third step.

According to a still further aspect, the present invention provides a method of focusing of an image-taking apparatus which allows still-image recording during moving-image recording. The focusing method includes a first step of generating a focus evaluation signal representing a focus state based on an output signal from an image-pickup device which photoelectrically converts an object image formed by an image-taking optical system including a focus lens and a second step of driving the focus lens such that an in-focus position is searched for based on the focus evaluation signal in performing moving-image recording. The method also includes a third step of driving the focus lens in a predetermined scan area to detect an in-focus position based on the focus evaluation signal and driving the focus lens to the detected in-focus position in performing still-image recording. The scan area is changed on the basis of the focus evaluation signal at the time of an instruction to perform focus adjustment operation for still-image recording when the still-image recording is performed during moving-image recording in the third step.

According to a still further aspect, the present invention provides a method of focusing of an image-taking apparatus which allows still-image recording during moving-image recording. The focusing method includes a first step of generating a focus evaluation signal representing a focus state based on an output signal from an image-pickup device which photoelectrically converts an object image formed by an image-taking optical system including a focus lens and a second step of driving the focus lens such that an in-focus position is searched for based on the focus evaluation signal in performing moving-image recording. The method also includes a third step of driving the focus lens in a predetermined scan area to detect an in-focus position based on the focus evaluation signal and driving the focus lens to the detected in-focus position in performing still-image recording. The focus lens is not driven for in-focus position detection when still-image recording is performed during moving-image recording and an in-focus level based on the focus evaluation signal is lower than a predetermined level at the time of an instruction to perform an focusing operation for the still-image recording in the third step.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
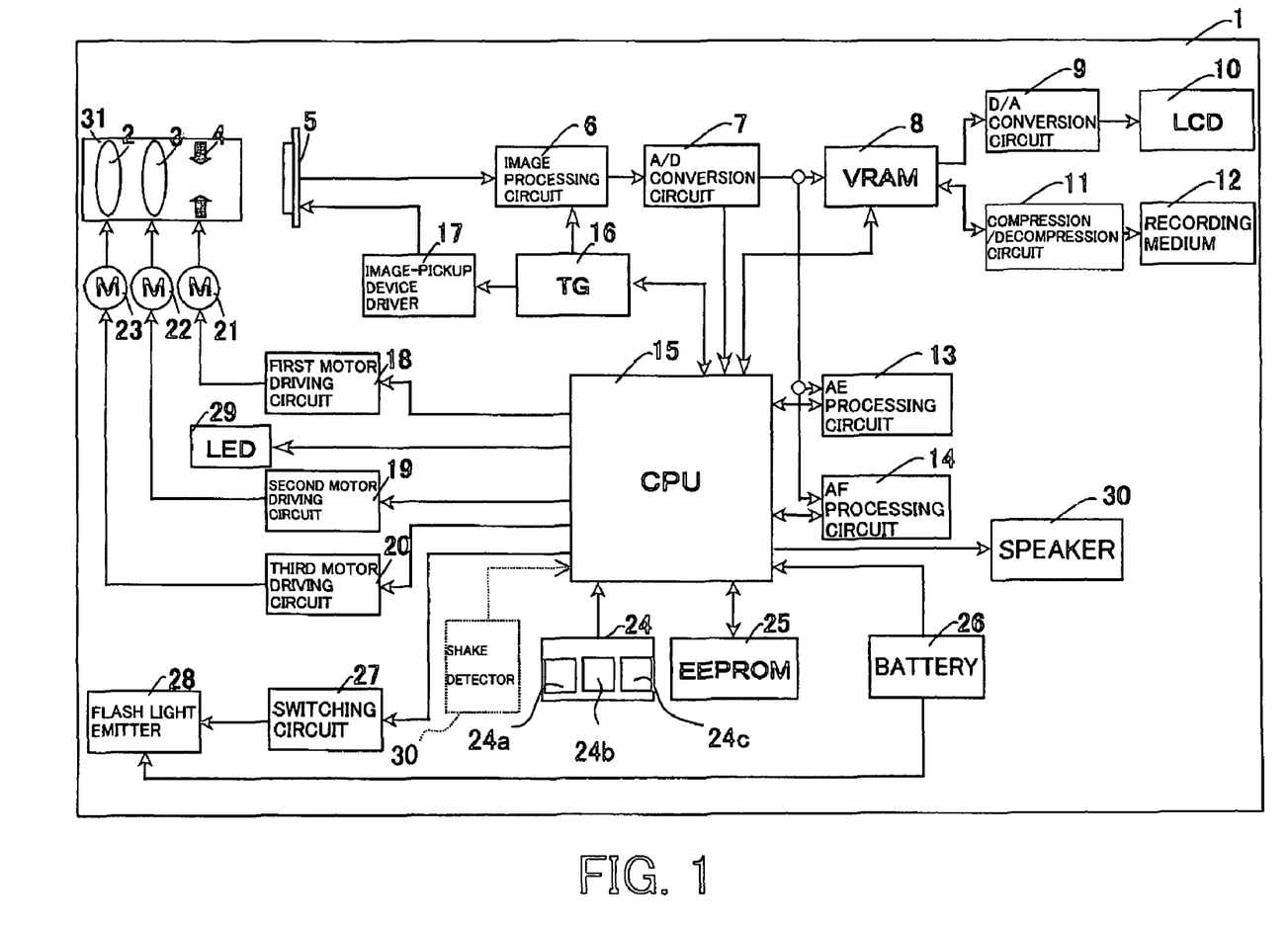
FIG. 1 is a block diagram showing the structure of an image-taking apparatus which is Embodiment 1 of the present invention.

FIG. 1 shows the structure of an image-taking apparatus which is Embodiment 1 of the present invention. In FIG. 1, reference numeral 1 shows the image-taking apparatus. Reference numeral 2 shows a zoom lens unit which is movable in the direction of an optical axis for varying magnification, and 3 a focus lens unit which is movable in the optical axis direction for focus adjustment. Reference numeral 4 shows an aperture unit which adjusts the amount of light transmitted through an image-taking optical system including the zoom lens unit 2 and the focus lens unit 3. The aperture unit 4 also serves as a shutter in taking a still image.

Reference numeral 31 shows an image-taking lens barrel which houses the image-taking optical system, and 5 a solid-state image-pickup device formed of a CCD sensor, a CMOS sensor or the like which photoelectrically converts an object image formed by the image-taking optical system.

Reference numeral 6 shows an image processing circuit which receives an electric signal output through the photoelectric conversion by the image-pickup device 5 and performs various types of processing on the electric signal to produce an image signal in a predetermined format.

Reference numeral 7 shows an A/D conversion circuit which converts the analog image signal produced by the image processing circuit 6 into a digital image signal, and 8 a memory (VRAM) such as a buffer memory which receives the output from the A/D conversion circuit 7 and temporarily stores the image signal.

Reference numeral 9 shows a D/A conversion circuit which reads out the image signal stored in the memory 8, converts it into an analog signal, and converts it into an image signal in the form suitable for reproduction and output. Reference numeral 10 shows a display unit such as an LCD which displays the image signal from the D/A conversion circuit 9.

Reference numeral 12 shows a recording medium which is formed of a semiconductor memory or the like and on which image data is recorded. As the recording medium 12, it is possible to use a fixed-type semiconductor memory such as a flash memory and a semiconductor memory such as a card-type flash memory in card or stick form removably loaded on the image-taking apparatus. It is also possible to use, as the recording memory 12, a variety of media such as a magnetic recording medium such as a hard disk and floppy disk and an optical disk which data is optically written to or read from.

Reference numeral 11 shows a compression/decompression circuit including a compression circuit which reads out the image signal temporarily stored in the memory 8 and performs compression and encoding on the image data to provide the data form suitable for recording on the recording medium 12 and a decompression circuit which performs decoding and decompression to provide the data form suitable for reproduction of the image data recorded on the recording medium 12.

Reference numeral 13 shows an AE (auto-exposure) processing circuit which receives the output from the A/D conversion circuit 7 and performs AE processing thereon, and 14 an AF processing circuit which receives the output from the A/D conversion circuit 7 and produces an AF evaluation value signal, later described.

Reference numeral 15 shows a CPU which serves as a control means responsible for the overall control of the image-taking apparatus 1 and includes a memory for computation. Reference numeral 16 shows a timing generator (hereinafter abbreviated as TG) which produces a predetermined timing signal, and 17 an image-pickup device driver which drives the image-pickup device 5.

Reference numeral 21 shows an aperture driving motor which drives the aperture unit 4, and 18 shows a first motor driving circuit which drives the aperture driving motor 21. Reference numeral 22 shows a focus driving motor which drives the focus lens unit 3, and 19 a second motor driving circuit which drives the focus driving motor 22.

Reference numeral 23 shows a zoom driving motor which drives the zoom lens unit 2, and 20 a third motor driving circuit which drives the zoom driving motor 20.

Reference numeral 24 shows an operation switch which includes various switches. The operation switch 24 includes a main power switch for activating the image-taking apparatus 1 to start power supply thereto, a release switch 24a for starting operation associated with still-image recording (for example, AF processing and image recording operation), and a moving-image taking switch 24b for starting moving-image recording. The operation switch 24 also includes an image-taking mode selection switch 24c for allowing a user to select a moving-image taking mode or still-image taking mode, a reproduction switch for starting reproduction of a recorded image, and a zoom switch for driving the zoom lens unit 2 of the image-taking optical system to perform zooming.

The release switch 24a has a dual structure consisting of a first stroke switch (hereinafter referred to as SW1) for producing an instruction signal to start AE processing and AF processing prior to the operation of still-image recording and a second stroke switch (hereinafter referred to as SW2) for producing an instruction signal to start the operation of still-image recording.

Reference numeral 25 shows a memory (EEPROM) in which computer programs for realizing various types of processing and data necessary for performing various operations are stored previously. The memory 25 is a read-only memory in which data is electrically rewritable.

Reference numeral 26 shows a battery which serves as a power supply of the image-taking apparatus, 28 a flash light emitter which illuminates an object with flash light, and 27 a switching circuit which controls the light emission of the flash light emitter 28.

Reference numeral 29 show a display device such as an LED which displays various alarms and the like, and 30 a speaker for guidance and alarm by sounds.

Next, the operation in the image-taking apparatus 1 of Embodiment 1 formed as described above will be described. A luminous flux from an object passes through the image-taking lens barrel 31 and the amount thereof is adjusted by the aperture unit 4. Then, the luminous flux reaches a light-receiving surface of the image-pickup device 5. An object image formed from the luminous flux is converted into an electric signal through the photoelectrical conversion function of the image-pickup device 5 and input to the image processing circuit 6.

The image processing circuit 6 performs various types of image processing on the photoelectrically converted signal input thereto to produce an image signal. The image signal is output to the A/D conversion circuit 7 and converted into a digital signal (image data) which is then stored temporarily in the memory 8.

The image data stored in the memory 8 is then output to the D/A conversion circuit 9 and converted into an analog signal. At this point, the image data is converted to have the form suitable for display on the display unit 10, and displayed later on the display unit 10 as an image.

The image data stored in the memory 8 is also output to the compression/decompression circuit 11. The compression circuit in the compression/decompression circuit 11 performs encoding and compression on the image data input thereto and converts it into image data in the form suitable for recording. The converted image data is recorded on the recording medium 12.

When the reproduction switch in the operation switch 24 is turned on, reproduction operation is started. The compressed image data recorded on the recording medium 12 is output to the compression/decompression circuit 11, subjected to decoding and decompression in the decompression circuit in the circuit 11, and then output to the memory 8 and stored temporarily therein. The image data is output to the D/A conversion circuit 9 and converted into an analog signal as an image signal in the form suitable for display on the display unit 10. The image signal is displayed as an image on the display unit 10.

The image data digitized by the A/D conversion circuit 7 is also output to the AE processing circuit 13 and the AF processing circuit 14 in addition to the above mentioned memory 8. The AE processing circuit 13 receives the digital image signal input thereto and performs computation such as a cumulative addition of the luminance value of image data for one frame. As a result, the AE evaluation value is calculated corresponding to the brightness of the object. The AE evaluation value is output to the CPU 15.

The AF processing circuit 14 receives the digital image signal input thereto and extracts high-frequency components of image data for one frame through a high-pass filter (HPF) or the like. The AF processing circuit 14 performs computation such as a cumulative addition of the high-frequency components. As a result, the AF evaluation signal (focus evaluation signal) is produced corresponding to the amount of outline components at high frequencies or the like. In this manner, the AF processing circuit 14 serves as a signal producing means for detecting the predetermined high-frequency components of the image signal produced from the photoelectrically converted signal output by the image-pickup device 5 to produce the AF evaluation value signal.

The TG 16 outputs the predetermined timing signal to the CPU 15, the image processing circuit 6, and the image-pickup device driver 17. The CPU 15 performs various types of control in synchronization with the timing signal. The image processing circuit 6 performs various types of image processing such as color signal separation in synchronization with the timing signal. The image-pickup device driver 17 drives the image-pickup device 5 in synchronization with the timing signal.

The CPU 15 controls the first motor driving circuit 18, the second motor driving circuit 19, and the third motor driving circuit 20. This causes the control of driving of the aperture unit 4, the focus lens unit 3, and the zoom lens unit 2 through the aperture driving motor 21, the focus driving motor 22, and the zoom driving motor 23, respectively. Specifically, the CPU 15 controls the first motor driving circuit 18 based on the AE evaluation value calculated in the AE processing circuit 13 and the like to achieve AE control including the adjustment of the aperture diameter of the aperture unit 4 and control of the shutter speed through the aperture driving motor 21.

The CPU 15 also controls the second motor driving circuit 19 based on the AF evaluation value signal from the AF processing circuit 14 to achieve AF control including the movement of the focus lens unit 3 to an in-focus position through the focus driving motor 22.

During taking of a moving image (including both of production of a through moving image which is not recorded on the recording medium 12 but displayed on the display unit 10 and recording of a moving image), the CPU 15 performs AF processing for moving-image taking referred to as TV-AF or continuous AF. The AF processing for moving-image taking involves searching for (tracing) the position of the focus lens where the AF evaluation value signal is at the maximum, that is, the in-focus position, while the focus lens unit 3 is moved in predetermined amounts in a direction determined on the basis of the AF evaluation value signal.

To perform still-image recording (that is, when the first stroke switch SW1 is turned on), the CPU 15 performs AF processing for still-image recording referred to as scan AF. The AF processing for still-image recording involves detecting the position where the AF evaluation value signal is at the maximum, that is, the in-focus position, while the focus lens unit 3 is driven from one end of a predetermined scan area to the other end, storing the detected in-focus position, and after the completion of the driving in the scan area (scan driving), driving the focus lens unit 3 to the stored in-focus position. The AF processing for still-image recording will hereinafter be referred to as scan AF processing.

When the zoom switch, not shown, is operated in the operation switch 24, the CPU 15 controls the third motor driving circuit 20 to move the zoom lens unit 2 through the zoom motor 23. This realizes operation for varying the magnification (zooming operation) of the image-taking optical system.

Next, the operation of the image-taking apparatus will be described with reference to a flow chart shown in FIG. 2. An image-taking processing sequence is performed when the main power switch of the image-taking apparatus 1 is on and the operation mode of the image-taking apparatus 1 is in an image-taking (image-recording) mode. The image-taking processing sequence and each processing sequence described below are performed in accordance with the computer programs stored in a memory, not shown, provided inside or outside the CPU 15.

In the image-taking processing sequence, at step (abbreviated as "S" in figures) 1, the CPU 15 causes an image of light transmitted through the image-taking lens barrel 31 and formed on the image-pickup device 5 to be displayed on the display unit 10 as a through image.

Specifically, the object image formed on the image-pickup device 5 is converted into an electric signal through the photoelectrical conversion by the image-pickup device 5 and output to the image processing circuit 6. The image processing circuit 6 performs various types of processing on the electric signal input thereto to produce an image signal in a predetermined format. The produced image signal is converted into image data as a digital signal by the A/D conversion circuit 7 and stored temporarily in the memory 8. The image data stored in the memory 8 is converted into an analog signal by the D/A conversion circuit 9 and displayed as the through image on the display unit 10.

Next, at step 2, the CPU 15 determines whether the image-taking mode is set to a moving-image taking mode or a still-image taking mode by checking the state of the above mentioned image-taking mode selection switch 24c. If it is set to the moving-image taking mode, the flow proceeds to step 3.

At step 3, AF processing for moving-image taking is performed for continuous adjustment of the exposure and focus for the object. At step 3, AE processing for moving-image taking is also performed. The following description will be made assuming that the above mentioned moving-image taking switch 24b is on and moving-image recording is started.

At step 4, the CPU 15 checks the state of the release switch 24a. If the CPU 15 finds that the release switch 24a is operated by the user to turn the first stroke switch SW1 on, the flow proceeds to step 5 and the scan AF processing is performed in the moving-image taking mode (during moving-image recording). At step 5, AE processing for still-image recording is also performed.

After the completion of the processing at step 5, the flow proceeds to step 9 to determine whether the reliability of the result of the scan AF processing (later described) is sufficient or not, and if it is sufficient, the CPU 15 performs display showing that the AF is effective (in-focus display). This is realized, for example, by lighting of the display device 29 or displaying a frame which represents an in-focus area on the display unit 10. If the reliability of the AF is insufficient (low), the CPU 15 performs display showing that the AF is ineffective (out-of-focus display) at step 9. This is realized, for example, by blinking of the display device 29 or displaying a frame on the display unit 10 in a different color from that when the AF is effective.

On the other hand, if it is determined that the still-image taking mode is set at step 2, the flow proceeds to step 6. At step 6, the CPU 15 checks the state of the release switch 24a. When the CPU 15 finds that the release switch 24a is operated by the user to turn the first stroke switch SW1 on, the flow proceeds to step 7 and AE processing for still-image recording is performed. Then, at step 8, the CPU 15 performs AF processing for still-image recording in the still-image taking mode.

The scan AF processing in the moving-image taking mode performed at step 5 described above and the scan AF processing in the still-image taking mode performed at step 8 have the same principles but differ in the scan area in which the focus lens unit 3 is driven. Specifically, in the scan AF processing in the moving-image taking mode, the focus lens unit 3 is driven in a scan area smaller than that in the scan AF processing in the still-image taking mode. In addition, the processing of changing the scan area is performed in the scan AF processing in the moving-image taking mode in accordance with an in-focus level at the time of the turn-on of the first stroke switch SW1. These operations are described later in detail.

After the completion of step 8, the flow proceeds to step 9 to show whether the AF is effective or ineffective depending on the reliability of the result of the scan AF as described above.

The flow proceeds to step 10 from step 9. The CPU 15 again checks whether the first stroke switch SW1 is on (whether or not the on-state is held). If the first stroke switch SW1 is on, the CPU 15 checks the state of the second stroke switch SW2 at step 11. When the on-state of the first stroke switch SW1 is held, the position of the focus lens unit 3 driven to the in-focus position through the scan AF and the result of the AE processing are maintained. If the second stroke switch SW2 is on, the flow proceeds to step 12, and a still image for recording is produced and recorded on the recording medium 12, that is, image-taking (exposure) processing is performed.

If the first stroke switch SW1 is off at step 10, the flow returns to step 2 to repeat the above mentioned operations.

Next, description will be made of the scan AF processing in the still-image taking mode performed at step 8 with reference to FIG. 3. In the scan AF processing, while the focus lens unit 3 is driven from one end to the other end of the predetermined scan area at predetermined intervals (scan intervals), the in-focus position where the AF evaluation value signal is at the maximum is detected and stored. After the completion of the driving (scan driving) in the scan area, the focus lens unit 3 is driven to the stored in-focus position.

Figure 2:
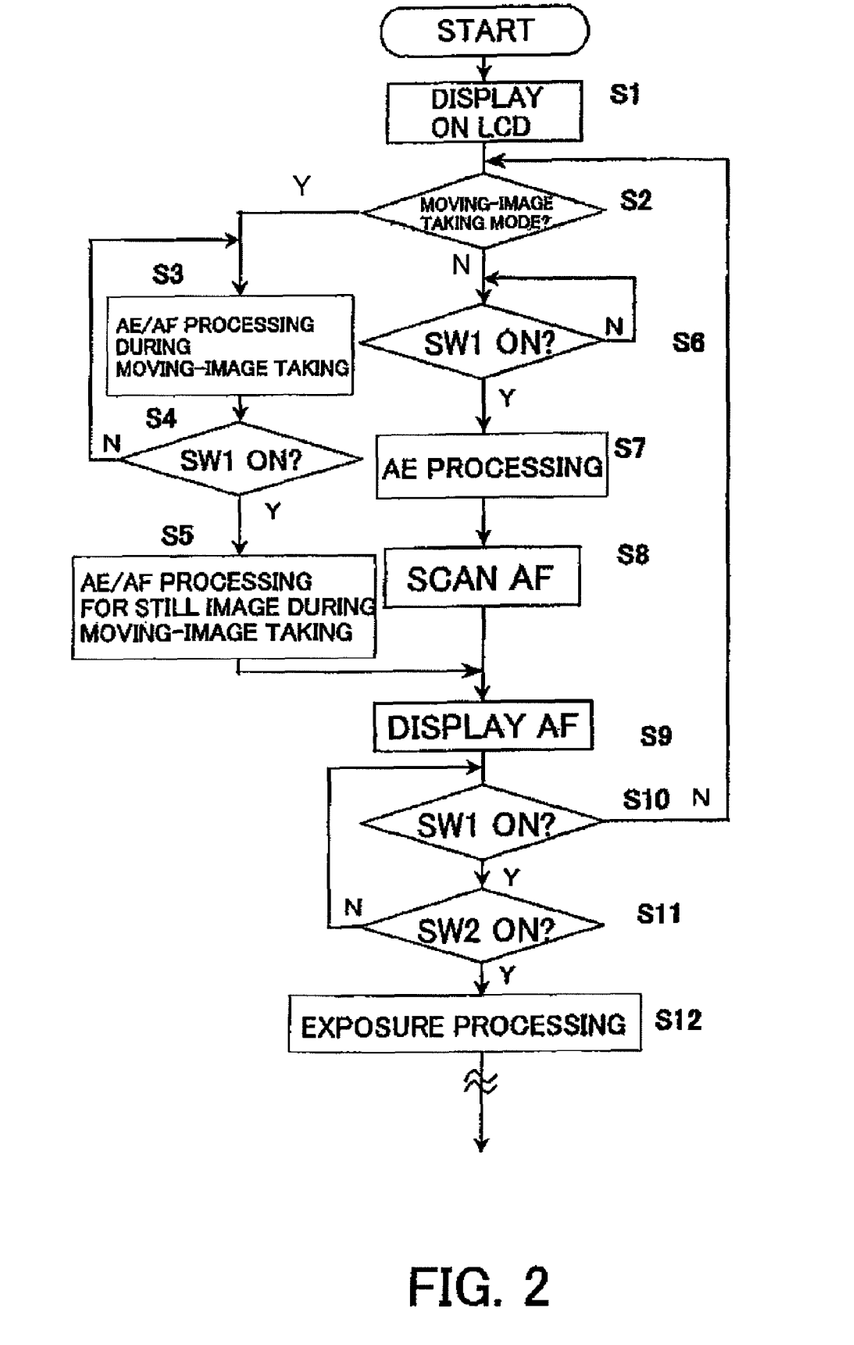
FIG. 2 is a flow chart showing the operation of the image-taking apparatus of Embodiment 1.
Figure 3:
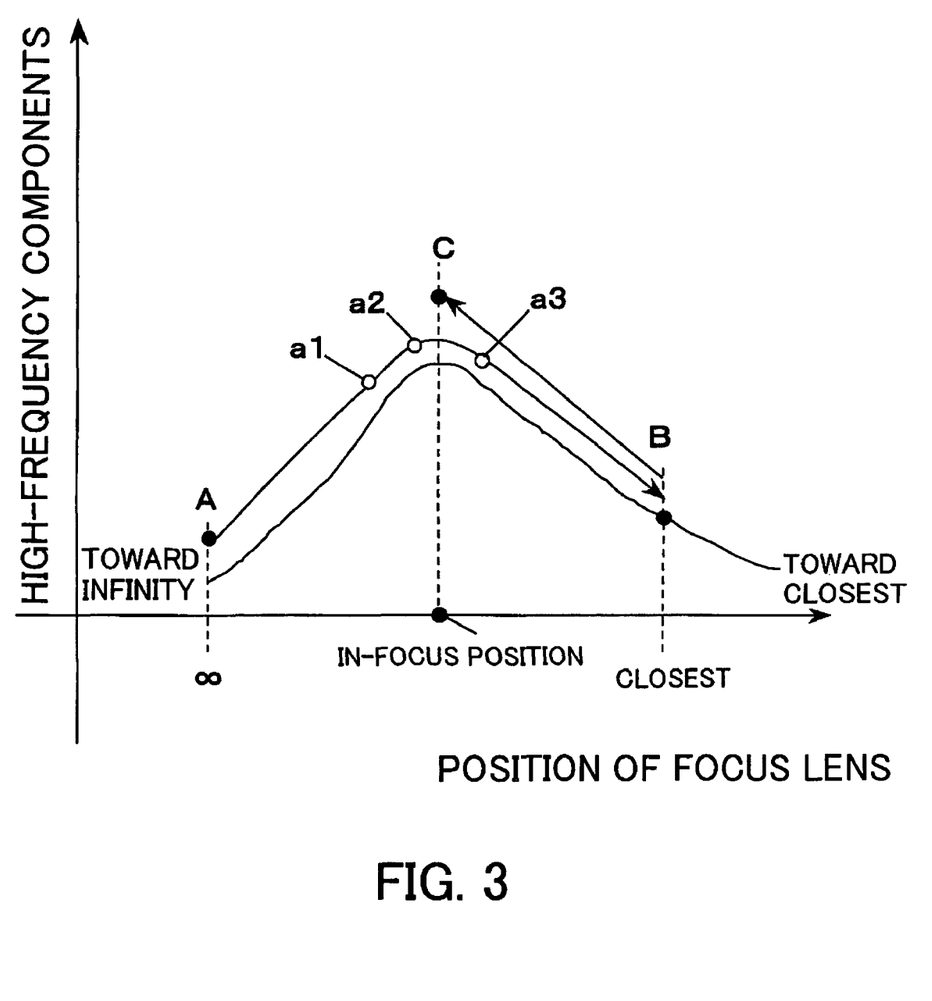
FIG. 3 is a graph for explaining scan AF processing in a still-image taking mode in the image-taking apparatus of Embodiment 1.

In the scan AF processing in the still-image taking mode, after the CPU 15 finds that first stroke switch SW1 is on at step 6 in FIG. 2, it moves the focus lens unit 3 to the position corresponding to the infinity (A in FIG. 3). Next, the CPU 15 drives the focus lens unit 3 from the position A to the position corresponding to the closest (B in FIG. 3) set in each image-taking mode. During the driving of the focus lens unit 3 from the position A to the position B, the AF evaluation value signal is taken from the AF processing circuit 14. When the driving of the focus lens unit 3 is finished, the in-focus position of the focus lens unit 3 (C in FIG. 3) is determined by using at least the maximum of all the taken AF evaluation value signals. Then, the focus lens unit 3 is driven to the in-focus position C.

The AF evaluation value signal is taken from the AF processing circuit 14 at a plurality of, for example, 20 stop positions of the focus lens at appropriate intervals (scan intervals) in order to perform the scan AF processing quickly. For example, when the AF evaluation value signal is taken at positions a1, a2, and a3 in FIG. 3, the in-focus position C is determined by calculation from the position a2 where the AF evaluation value signal is at the maximum and the positions a1 and a3 before and after the position a2.

Figure 4:
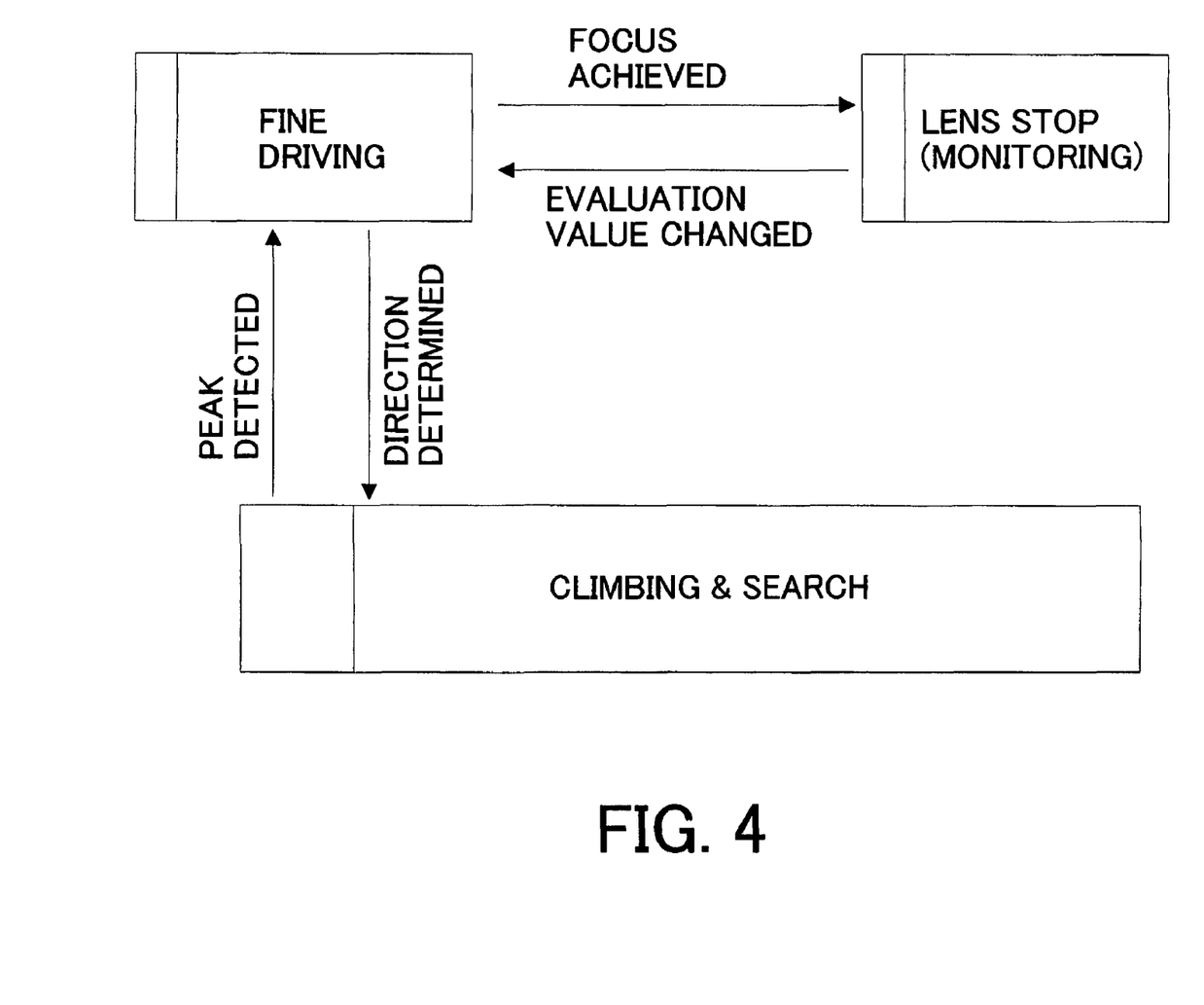
FIG. 4 is a diagram for explaining AF processing for moving-image taking in the image-taking apparatus of Embodiment 1.

Next, the AF processing for moving-image taking performed at step 3 will be described with reference to FIG. 4. The AF processing for moving-image taking includes three modes, that is, a fine driving mode, a climbing mode, and a lens stop (monitoring) mode, in which transition from one mode to another is performed on the basis of the operation result in the one mode.

In the fine driving mode, the focus lens unit 3 is moved by a predetermined small distance, and the AF evaluation value at the position before the movement is compared with the AF evaluation value at the current position to determine the direction of driving for focusing, determine the in-focus state, and adjust focus through driving of the focus lens unit 3 by a short distance.

Specifically, if the current AF evaluation value of the focus lens unit 3 is higher than the AF evaluation value before the movement, it is determined that the focus lens unit 3 is approaching the in-focus position, and the focus lens unit 3 is subsequently driven in the same direction. On the other hand, if the current AF evaluation value is lower than the AF evaluation value before the movement, it is determined that the focus lens unit 3 is being moved away from the in-focus position, and the focus lens unit 3 is driven in the opposite direction. When the focus lens unit 3 is moved in the same direction a predetermined number of times (when the AF evaluation value signal continues to increase), the fine driving mode is transitioned to the climbing mode. When the moving direction is repeatedly reversed in an area considered to be the same for a predetermined time period (when the AF evaluation value is alternately increased and reduced across the maximum value), it is determined that the in-focus state is almost achieved, and the focus lens unit 3 is moved to the position where the AF evaluation value is at the maximum, followed by transition to the lens stop mode.

In the climbing mode, the focus lens unit 3 is driven by a long distance to adjust focus. Specifically, the focus lens unit 3 is driven at constant speed in the direction for focusing determined in the fine driving mode, and when the AF evaluation value starts to reduce after it passes the maximum value, the focus lens unit 3 is returned to the position corresponding to the maximum value. Then, the climbing mode is transitioned to the fine driving mode.

In the lens stop mode, unless the AF evaluation value is significantly changed, the focus lens unit 3 is stopped for maintaining the in-focus state. In the lens stop mode, the AF evaluation value at the time of the transition from the fine driving mode is stored and compared with the latest AF evaluation value taken after the transition. When the latest AF evaluation value is changed from the AF evaluation value at the time of the transition by a predetermined amount or more, the lens stop mode is transitioned to the fine driving mode.

In the AF processing for moving-image taking, transition between the three modes can be performed to achieve focus from an out-of-focus state and maintain the in-focus state.

Figure 5:
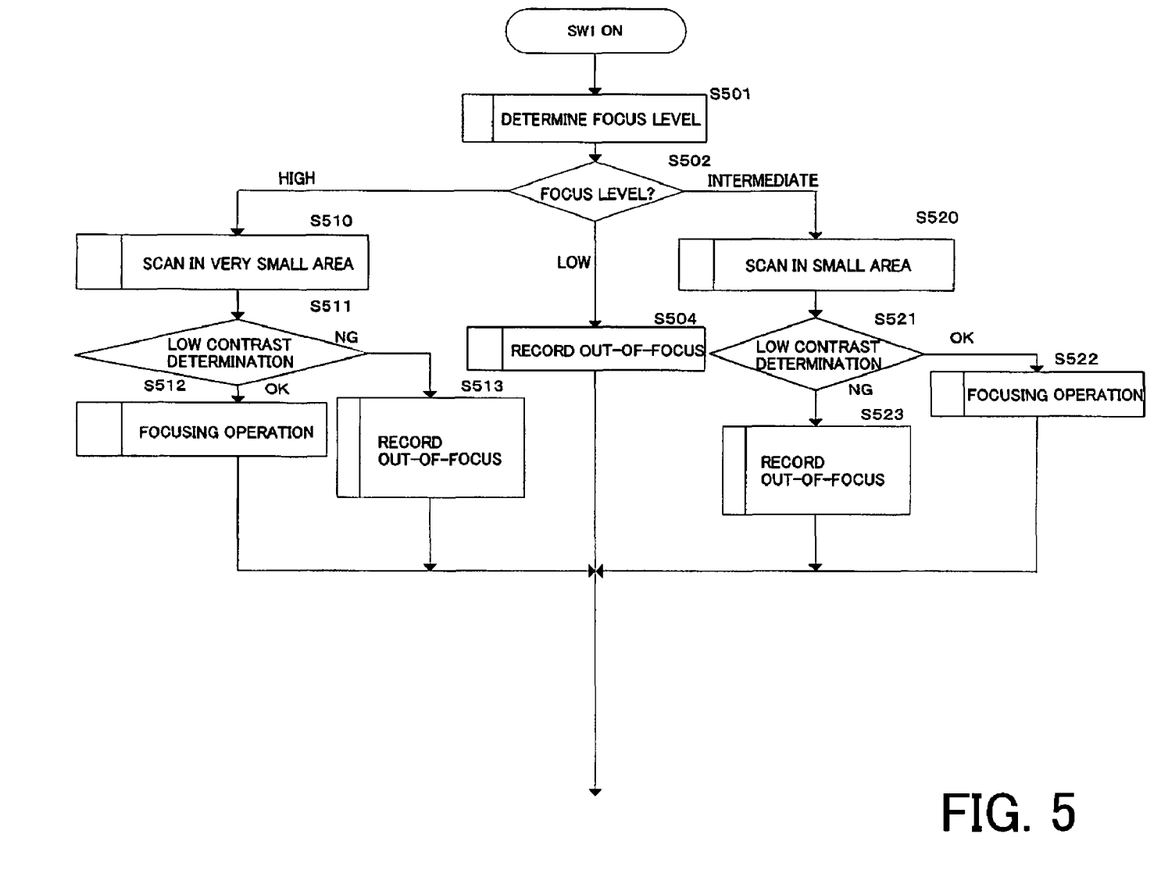
FIG. 5 is a flow chart showing scan AF processing for still-image recording during moving-image recording in the image-taking apparatus of Embodiment 1.

Next, the scan AF processing in the moving-image taking mode performed at step 5 will be described with reference to a flow chart in FIG. 5.

After the CPU 15 finds that the first stroke switch SW1 is on at step 4 of FIG. 2, the flow proceeds to step 501 to determine the in-focus level of the focus lens unit 3 at that position thereof. The in-focus level is determined by using the following two AF evaluation values provided from the AF processing circuit 14.

One of them is the maximum value in the high-frequency components of image data for one frame extracted from the digital image signal input to the AF processing circuit 14 through a high-pass filter (HPF) or the like. This is used as a first AF evaluation value signal. The other is the difference between the maximum value and the minimum value of image data for one frame extracted from the digital image signal input to the AF processing circuit 14 not through the high-pass filter (HPF) or the like. This is used as a second AF evaluation signal.

The in-focus level is represented as the ratio between the above mentioned first AF evaluation value and second AF evaluation value, that is, the first AF evaluation signal divided by the second AF evaluation signal.

For determining the in-focus position actually, the AF processing circuit 14 uses a value provided by the cumulative addition of the high-frequency components of image data for one frame extracted from the digital image signal input thereto through the high-pass filter (HPF) or the like. This is used as a third AF evaluation value.

At step 502, it is determined whether the in-focus level determined at step 501 is high, low, or intermediate. Specifically, the in-focus level determined at step 501 is compared with a first threshold value for determination of a high level and a second threshold value for determination of a low level, and if the in-focus level is higher than the first threshold value, lower than the second threshold value, and lower than the first threshold value and higher than the second threshold value, "high," "low," and "intermediate" are determined, respectively.

When the in-focus level is determined as "high," the flow proceeds to step 510. When it is determined as "low," the flow proceeds to step 504. When it is determined as "intermediate," the flow proceeds to step 520.

When the flow proceeds to step 504, that is, when the in-focus level is "low," the image is significantly blurred and the focus lens unit 3 should be moved largely for focusing. It is often unclear whether the in-focus position is nearer to the infinity or closest relative to the current position of the focus lens unit 3. In addition, it is assumed that the contrast of the object is low and the in-focus position is difficult to determine.

In such a case, the focus lens unit 3 is moved largely, and when the moving image is recorded and reproduced, the resulting image is visually undesirable since the focus state is greatly changed due to the movement of the focus lens unit 3. This phenomenon is conspicuous especially when the focus lens unit 3 is driven in the wrong direction for focusing. Specifically, the blurring of the image is once increased, and then the driving direction of the focus lens unit 3 is reversed to reduce the blurring and achieve focus, so that it may create the impression that the AF is malfunctioning. In addition, when the contrast is low and focusing is difficult to achieve, the blurring of the image is increased after the image is close to an in-focus state, and then the focus lens unit 3 is reversed to achieve focus. In this case, since the image at the start of the AF is close to an in-focus state, the image is more undesirable visually than that when the focus lens unit 3 is driven in the wrong direction for focusing.

If the AF operation is performed on the significantly blurred image until a sufficient in-focus state is achieved for recording a high-resolution still image, the AF operation needs a long time. During that time, if a scene change such as panning or a movement of the object in a front, back, left, or right direction is made, the focus state of the still image is insufficient and also the focus state of a moving image recorded after the recording of the still image may be deteriorated.

For these reasons, when the in-focus level is low, the scan AF processing is not performed (prohibited). Then, the flow proceeds to step 504 and the out-of-focus state is recorded, and the out-of-focus state is displayed at step 9 in FIG. 2.

When the in-focus level is determined as "high" at step 502 and the flow proceeds to step 510, the focus state is considered to be sufficient for the number of pixels on the image-pickup device 5 used in moving-image recording. In this case, the position of the focus lens unit 3 considered to be the in-focus position for the number of pixels in still-image recording larger than the number of pixels in moving-image recording is near the current position of the focus lens unit 3. Thus, the scan driving of the focus lens unit 3 may be performed in the extremely small scan area including the current position of the focus lens unit 3. At step 510, the scan driving is performed in the "very small" scan area.

At step 511, low contrast determination is performed to determine whether or not focusing is possible from the AF evaluation value provided by the scan driving at step 510. The low contrast determination is performed for determining the reliability of the result of the above mentioned scan AF processing.

When it is determined that the object is not at low contrast and focusing is possible, that is, when the reliability of the result of the scan AF processing is sufficient, the flow proceeds to step 512 to perform driving of the focus lens unit 3 to the in-focus position (focusing operation). When it is determined that the object is at low contrast and focusing is not possible, that is, when it is determined that the reliability of the result of the scan AF processing is insufficient, the flow proceeds to step 513 to record the out-of-focus state and then the flow proceeds to step S9 in FIG. 2 to display the out-of-focus state.

When a still image is recorded in the still-image taking mode, and the out-of-focus state is determined in the low contrast determination, the focus lens unit 3 may be driven to the position referred to as a fixed point uniquely specified from the object luminance and focal length of the image-taking lens. However, when the still-image recording is performed in the moving-image taking mode, it is better to minimize focus changes recorded in the moving image. Thus, in Embodiment 1, when the out-of-focus is determined in the low contrast determination at step 511, the focus lens unit 3 is driven to the position considered to be nearest to the in-focus position among the stop positions of the focus lens unit 3 where the AF evaluation value is taken in the scan driving.

The low contrast determination is described, for example, in Japanese Patent Laid-Open No. 2004-101766. When the object is not at low contrast, the AF evaluation value signal is changed in the form of a mountain from the infinity to the closest as shown in FIG. 3. It is thus possible to determine whether or not the object is at low contrast, that is, the reliability of the AF result, by determining whether or not the AF evaluation value signal is changed in the form of a mountain based on the difference in the maximum and minimum of the AF evaluation value signals, the length of part of the curve at a certain inclination or more, and the slope of an inclined portion of the curve.

Figure 6:
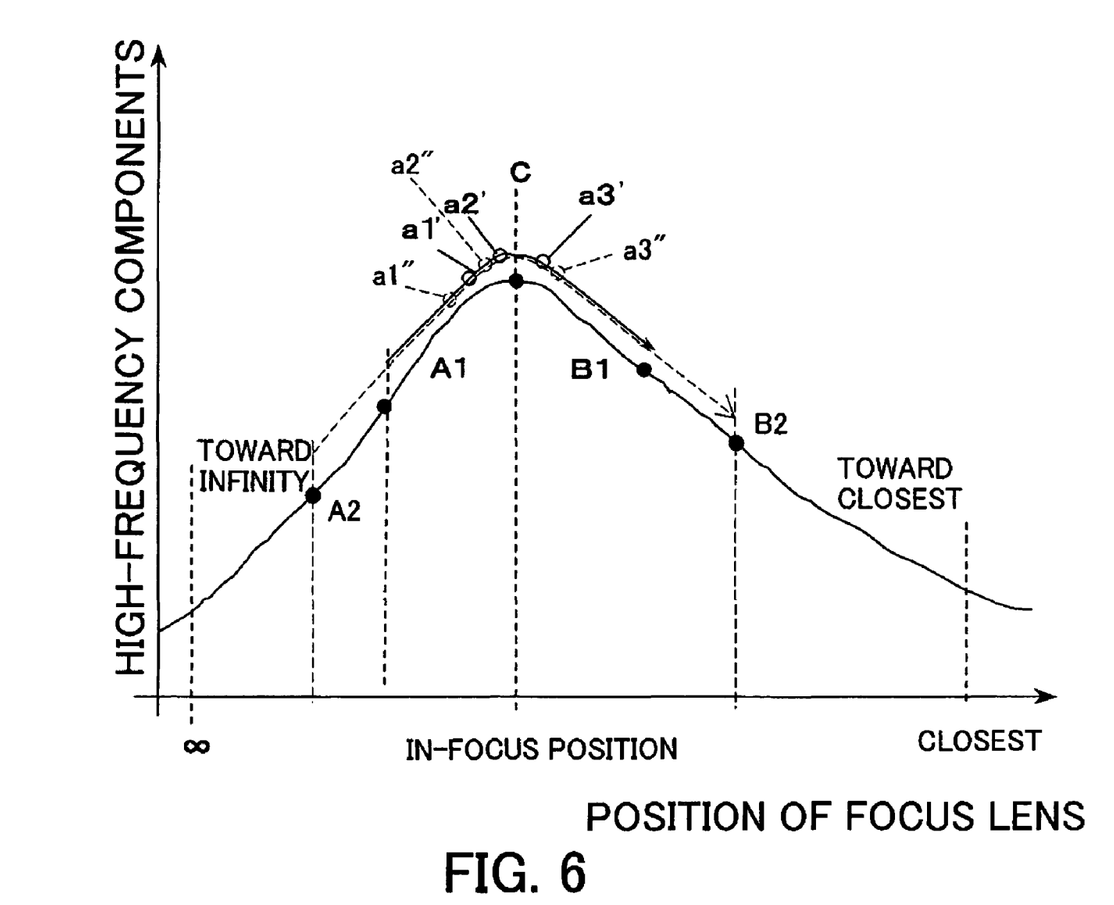
FIG. 6 is a graph for explaining the scan AF processing for still-image recording during moving-image recording in the image-taking apparatus of Embodiment 1.

Next, description will be made of the scan AF operation in the "very small" scan area performed at step 510 with reference to FIG. 6. After the CPU 15 finds that the first stroke switch SW1 is on at step 4 in FIG. 2, it moves the focus lens unit 3 to the scan start position A1. Next, the CPU 15 drives the focus lens unit 3 to the scan finish position B1 from the position A1 at a predetermined speed. During that time, the AF evaluation value signal is taken at predetermined scan intervals. The scan area from the position A1 to the position B1 is significantly smaller than the above mentioned scan area in the scan AF processing for the still-image recording (the entire movable range of the focus lens unit 3 from the infinity to the closest).

After the driving of the focus lens unit 3 is completed, the in-focus position C of the focus lens unit 3 is determined by using at least the maximum of all the taken AF evaluation value signals. When it is determined that the object is not at low contrast at step 511, the focus lens unit 3 is driven to the in-focus position C at step 512.

In the scan AF processing at step 510, the number of points where the AF evaluation value is taken (the stop positions of the focus lens unit 3) is set to five or so. The distance between the position A1 and the position B1 which corresponds to the scan area is set to approximately twice the focal depth (that is, the in-focus allowable area or the in-focus allowable moving amount) when moving-image recording is performed at the current position of the focus lens. Both of the positions A1 and B1 are set within substantially the same distance as the above mentioned focal depth from the position of the focus lens unit 3 before the movement to the position A1. In other words, the scan area is set with its center located substantially at the position of the focus lens unit 3 before the movement to the position A1. Through such setting, even when the scan AF processing for still-image recording is performed during moving-image recording to move the focus lens unit 3, any focus change is hardly recognized in the recorded moving image and the quality of the recorded moving image is not deteriorated.

In this case, the AF evaluation value is taken only at a plurality of focus lens stop positions at appropriate intervals (scan intervals) for the same reason as in the scan AF processing in the still-image taking mode described above. For example, if the AF evaluation value signal is taken at positions a1', a2', and a3' in FIG. 6, the in-focus position C is determined by calculation from the position a2' where the AF evaluation value signal is at the maximum and the positions a1' and a3' before and after the position a2'.

Next, description will be made of the scan AF processing when the in-focus level is determined to be "intermediate" at step 502 and the flow proceeds to step 520. In this case, the image is close to an in-focus state for the number of pixels for moving-image recording, but it requires focus adjustment for the number of pixels for still-image recording.

In this case, the position of the focus lens unit 3 considered to be the in-focus position for the number of pixels for still-image recording is not located far from the current position of the focus lens unit 3 (however, it is located farther than the position when the in-focus level is "high"). Thus, the scan driving may be performed in the area which is larger than the area when the in-focus level is "high" but is smaller than the scan area in the scan AF processing for still-image recording (the entire movable range of the focus lens unit 3). Thus, at step 520, the scan driving is performed in the "small" scan area.

At step 521, the above mentioned low contrast determination is made from the AF evaluation value signal provided from the scan driving at step 520. When it is determined that the object is not at low contrast and focusing is possible, the flow proceeds to step 522 to drive the focus lens unit 3 to the in-focus position (focusing operation) When it is determined that the object is at low contrast and focusing is impossible, the flow proceeds to step 523 to record the out-of-focus state, and the flow proceeds to step S9 in FIG. 2 to display the out-of-focus state.

Similarly to the above mentioned case where it is determined that the in-focus level is high but the object is at low contrast, when the out-of-focus state is determined in the low contrast determination at step 521, the focus lens unit 3 is moved to the position considered to be nearest to the in-focus position among the positions of the focus lens unit 3 where the AF evaluation value signal is taken.

Description will hereinafter be made of the scan AF operation in the "small" scan area performed at step 520 with reference to FIG. 6. After the CPU finds that the first stroke switch SW1 is on at step 4 of FIG. 2, it moves the focus lens unit 3 to the scan start position A2. Next, it drives the focus lens unit 3 to the scan finish position B2 from the position A2 at a predetermined speed; it drives the focus lens unit 3 without stopping. During that time, the AF evaluation value is taken at predetermined intervals (scan intervals). The scan area from the position A2 to the position B2 is smaller than the above mentioned scan area in the scan AF processing for still-image recording (the entire range from the infinity to the closest) and larger than the scan area in the scan AF processing when the in-focus level is "high" (between the positions A1 and B1).

After the driving of the focus lens unit 3 is completed, the in-focus position C of the focus lens unit 3 is determined by using at least the maximum of all the taken AF evaluation value signals. Then, if it is determined that the object is not at low contrast at step 521, the focus lens unit 3 is driven to the in-focus position C at step 522.

In the scan AF processing at step 520, the number of points where the AF evaluation value is taken (the stop positions of the focus lens unit 3) is set to five or so. The distance between the position A2 and the position B2 which corresponds to the scan area is set to approximately five times longer than the focal depth (that is, the in-focus allowable area or the in-focus allowable moving amount) when moving-image recording is performed at the current position of the focus lens. Both of the positions A2 and B2 are set within the distance 2.5 times longer than the above mentioned focal depth allowable in moving-image taking from the position of the focus lens unit 3 before the movement to the position A2. In other words, the scan area is set with its center located substantially at the position of the focus lens unit 3 before the movement to the position A2. Through such setting, when the scan AF processing for still-image recording is performed during moving-image recording to move the focus lens unit 3, some focus change is recognized in the recorded moving image but the change is small and is seen for a short time period, so that the quality of the recorded moving image is not significantly deteriorated.

The AF evaluation value is taken only at a plurality of focus lens stop positions at appropriate intervals (scan intervals) for the same reason as in the scan AF processing in the above mentioned still-image taking mode. For example, if the AF evaluation value signal is taken at positions a1", a2", and a3" in FIG. 6, the in-focus position C is determined by calculation from the position a2" where the AF evaluation value signal is at the maximum and the positions a1" and a3" before and after the position a2".

Embodiment 2

Figure 7:
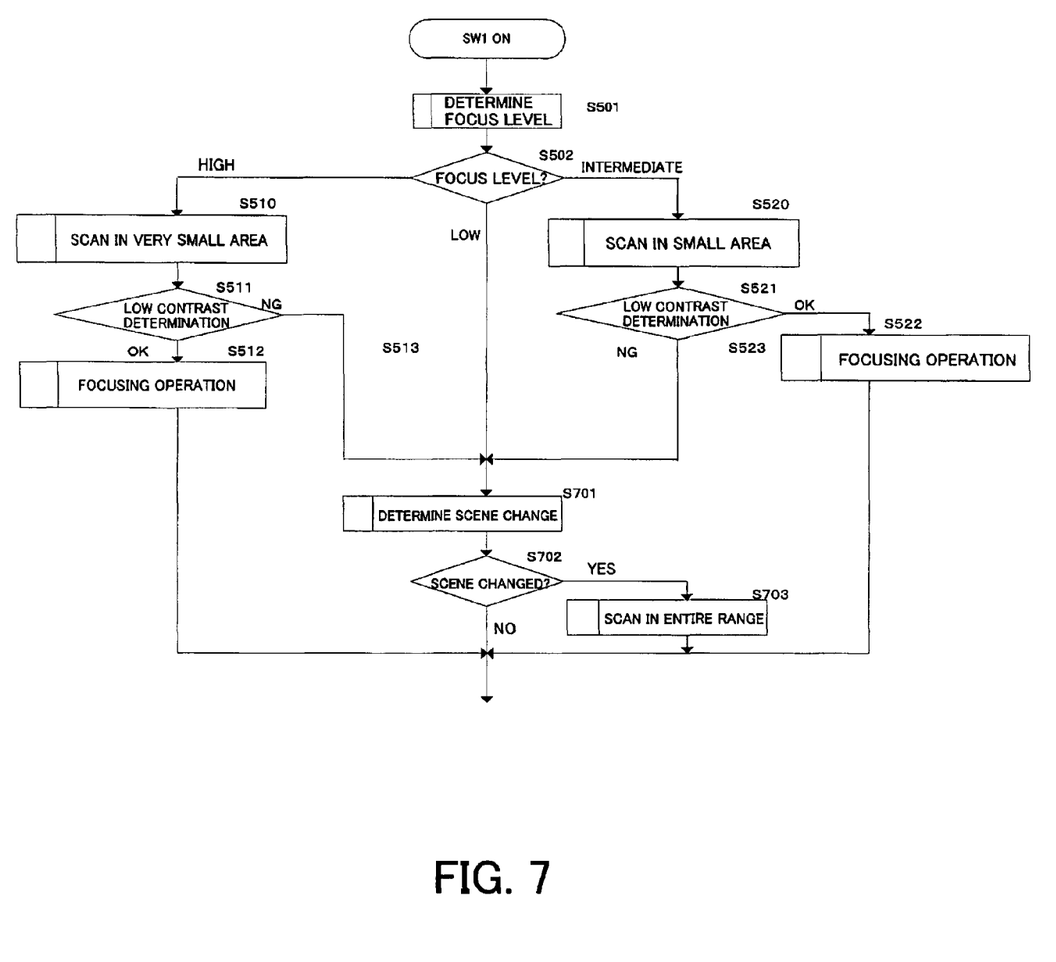
FIG. 7 is a flow chart showing scan AF processing for still-image recording during moving-image recording in an image-taking apparatus which is Embodiment 2 of the present invention.

FIG. 7 shows an operation flow of an image-taking apparatus which is Embodiment 2 of the present invention. Embodiment 2 differs from Embodiment 1 in processing when the in-focus level is determined to be "low." Other processing steps are identical to those designated with the same reference numerals in Embodiment 1. The structure of the image-taking apparatus of Embodiment 2 is basically the same as that of the image-taking apparatus of Embodiment 1 shown in FIG. 1, and the common components are designated with the same reference numerals. However, Embodiment 2 is applicable to the case where it includes a shake detection sensor such as an acceleration sensor and an angular velocity sensor for detecting a shake of the image-taking apparatus. FIG. 1 shows the shake detection sensor 30 by dotted lines.

In FIG. 7, when it is determined that the in-focus level is "low" at step 502, the flow proceeds to step 701 to determine a scene change. When it is determined that a scene change is present, the flow proceeds to step 703 through step 702. At step 703, the scan driving of the focus lens unit 3 is performed in the entire range from the infinity to the closest (entire-range scan) which is the same as the scan area in the scan AF processing for still-image recording. Specifically, while the focus lens unit 3 is moved from the position corresponding to the infinity to the position corresponding to the closest in the image-taking mode set at that point, the AF evaluation value is taken at predetermined scan intervals, and the in-focus position is determined from the results.

However, the entire-range scan is not always performed in the same manner, and when it is determined that the in-focus position can be specified in the process of the san driving, the scan driving is finished at that point.

The determination of a scene change at step 701 is performed by previously recording the computed value of the output (the value of shake detection) from the shake detection sensor 30 immediately before the turn-on of the first stroke switch SW1, the white balance coefficient of the object, and the object luminance, again taking these values at the time of the determination of a scene change, and comparing them.

It is determined that a scene is changed when the comparison reveals:

(1) it can be determined from the shake detection value that the image-taking apparatus 1 is moved by a predetermined amount or more (for example, an angular movement twice or more the angle of view for the focal length in image recording of the image-taking lens);

(2) the white balance coefficient of the object is changed by a predetermined value (for example, 30%) or more; and (3) the object luminance is changed by a predetermined value (for example, two steps) or more.

In Embodiment 2, when it is determined that the object is at low contrast (out-of-focus) at steps 511 and 521, the flow also proceeds to step 701 to determine a scene change. Then, if it is determined that some scene change is present, the entire-range scan is performed.

On the other hand, if any scene change is not recognized at steps 701 and 702, the scan AF processing is not performed (prohibited) similarly to Embodiment 1. The out-of-focus state is recorded. The flow proceeds to step 9 in FIG. 2 to display the out-of-focus state.

Embodiment 3

Figure 8:
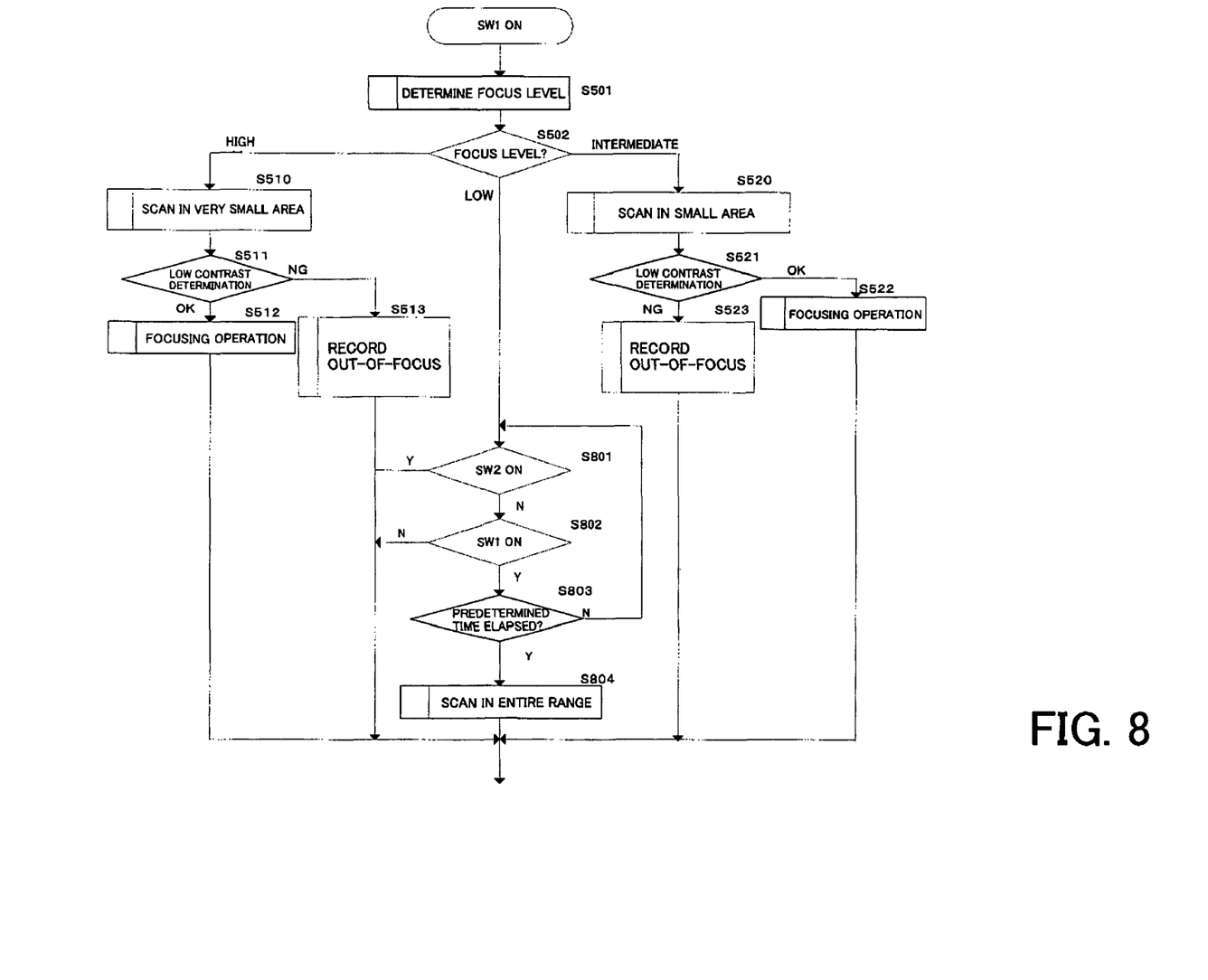
FIG. 8 is a flow chart showing scan AF processing for still-image recording during moving-image recording in an image-taking apparatus which is Embodiment 3 of the present invention.

FIG. 8 shows an operation flow of an image-taking apparatus which is Embodiment 3 of the present invention. Embodiment 3 differs from Embodiments 1 and 2 in processing when the in-focus level is determined to be "low." Other processing steps are identical to those designated with the same reference numerals in Embodiment 1. The structure of the image-taking apparatus of Embodiment 2 is basically the same as that of the image-taking apparatus of Embodiment 1 shown in FIG. 1, and the common components are designated with the same reference numerals.

In FIG. 8, when it is determined that the in-focus level is "low" at step 502, the flow proceeds to step 801 to determine whether a second stroke switch SW2 is on or not. When it is off, the flow proceeds to step 802 to check whether a first stroke switch SW1 is on or not. When it is on, the flow proceeds to step 803 to check whether a predetermined time period has elapsed since the turn-on of the first stroke switch SW1. If the predetermined time period has elapsed, the flow proceeds to step 804 to perform entire-range scan.

With such operation, the entire-range scan is performed only when the first stroke switch SW1 is held on for the predetermined time period or more.

On the other hand, if the first stroke switch SW1 is not held on for the predetermined time period or more, the scan AF processing is not performed (prohibited) similarly to Embodiment 1. Then, the out-of-focus state is recorded. The flow proceeds to step 9 in FIG. 2 to display the out-of-focus state.

As described above, according to each of Embodiments 1 to 3, even when the number of pixels of a recorded moving image is different from the number of pixels of a recorded still image (the number of pixels of the recorded still image is larger than the number of pixels of the recorded moving image), the scan driving of the focus lens unit 3 can be performed in the small area including the in-focus position in moving-image recording to reduce a focus change in the moving image being recorded and achieve a sufficiently high in-focus level for still-image recording (an almost in-focus state).

The area (scan area) where the scan driving of the focus lens unit 3 is performed for still-image recording during moving-image recording is set to the very small area when the in-focus level is high at the time of the operation of the first stroke switch SW1 and proper focus is achieved for the number of pixels of the recorded moving image. Thus, a focus change in the recorded moving image is reduced to be imperceptible to a viewer of the moving image and a still image can be recorded with a high in-focus level.

When the in-focus level is somewhat low ("intermediate") at the time of the operation of the first stroke switch SW1, and the image is slightly blurred for the number of pixels of the recorded moving image, the scan area is set to the area larger than the above mentioned very small area and smaller than the entire movable area of the focus lens unit 3 (for example, the area which is approximately 2.5 times larger than the very small area) Thus, a focus change is recognizable for the number of pixels of the recorded moving image, but it can be reduced to an almost insignificant level with the driving amount and driving time of the focus lens unit 3.

If the in-focus level is low at the time of the operation of the first stroke switch SW1, and it is determined that in-focus position cannot be detected even when the focus lens unit 2 is driven in the area larger than the above mentioned small area, the scan driving of the focus lens unit 3 is prohibited. Consequently, a release time lag can be reduced in still-image recording during moving-image recording and a focus change can be minimized to avoid deterioration of the quality of the recorded moving image.

While each of Embodiments 1 to 3 has been described in conjunction with the case where the focus lens isn't stopped when the AF evaluation value signal is taken, the AF evaluation value signal may be taken while the focus lens is stopped when the AF evaluation value signal is taken.

This application claims a foreign priority benefit based on Japanese Patent Application No. 2005-124305, filed on Apr. 21, 2005, which is hereby incorporated by reference herein in its entirety as if fully set forth herein.

What is claimed is:

1. An image-taking apparatus configured to have a moving-image recording mode and a still-image recording mode and allows still-image recording in the moving-image recording mode, the apparatus comprising:

an image-pickup device configured to photoelectrically convert an object image formed by an image-taking optical system including a focus lens;

a signal generator configured to generate a focus evaluation signal representing a focus state based on an output signal from the image-pickup device; and a controller configured to drive the focus lens such that an in-focus position is searched for based on the focus evaluation signal in performing moving-image recording, configured to drive the focus lens in a predetermined scan area to detect an in-focus position based on the focus evaluation signal, and drives the focus lens to the detected in-focus position in performing still-image recording, wherein the controller is configured to drive the focus lens in a first scan area in performing still-image recording in the still-image recording mode, and configured to drive focus lens in a second scan area that is smaller than the first scan area in performing the still-image recording in the moving-image recording mode, and wherein the second scan area is set when an instruction of the still-image recording is made by a user in the moving-image recording mode and an in-focus level before the focus lens is driven in response to the instruction is higher than a predetermined level, the in-focus level being determined based on the focus evaluation signal generated by the signal generator.

2. The image-taking apparatus according to claim 1, wherein the second scan area is set on the basis of an in-focus allowable moving amount in the moving-image recording of the focus lens when the instruction of the still-image recording is made in the moving-image recording mode.

3. The image-taking apparatus according to claim 1, wherein the first scan area is the entire movable range of the focus lens in taking images.

4. The image-taking apparatus according to claim 1, wherein the controller prohibits driving the focus lens for in-focus position detection in the second scan area when an in-focus level is lower than a predetermined value at the time an instruction to perform an focusing operation for still-image recording in the moving-image recording mode.

5. The image-taking apparatus according to claim 4, wherein the controller drives the focus lens in the first scan area when the in-focus level is lower than the predetermined value and a change of the state of image taking is detected.

6. The image-taking apparatus according to claim 1, further comprising an operation member which is used to issue an instruction to performs an focusing operation for still-image recording, wherein the controller drives the focus lens in the first scan area when the operation member continues to be operated for a predetermined time period in the moving-image recording mode.

7. A method of focusing on an image-taking apparatus configured to have a moving-image recording mode and a still-image recording mode and allows still-image recording in the moving-image recording mode, the method comprising the steps of:

a first step of generating a focus evaluation signal representing a focus state based on an output from an image-pickup device configured to photoelectrically convert an object image formed by an image-taking optical system including a focus lens; and a third step of driving the focus lens in a predetermined scan area to detect an in-focus position based on the focus evaluation signal and driving the focus lens to the detected in-focus position in performing still-image recording, wherein the focus lens is driven in a first scan area in performing the still-image recording in the still-image recording mode, and the focus lens is driven in a second scan area that is smaller than the first scan area in performing the still-image recording in the moving-image recording mode in the third step, and wherein the second scan area is set when an instruction of the still-image recording is made by a user in the moving-image recording mode and an in-focus level before the focus lens is driven in response to the instruction is higher than a predetermined level, the in-focus level being determined based on the focus evaluation signal.

* * * * *